US009803856B2

(12) United States Patent
Kim et al.

(10) Patent No.: US 9,803,856 B2
(45) Date of Patent: Oct. 31, 2017

(54) RICH-LEAN COMBUSTION APPARATUS

(71) Applicant: KYUNGDONG NAVIEN CO., LTD., Pyeongtaek-si, Gyeonggi-do (KR)

(72) Inventors: Sung Ki Kim, Yongin-si (KR); Myoung Gee Min, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 1 day.

(21) Appl. No.: 15/035,681

(22) PCT Filed: Nov. 13, 2014

(86) PCT No.: PCT/KR2014/010887
§ 371 (c)(1),
(2) Date: May 10, 2016

(87) PCT Pub. No.: WO2015/072759
PCT Pub. Date: May 21, 2015

(65) Prior Publication Data
US 2016/0305654 A1   Oct. 20, 2016

(30) Foreign Application Priority Data

Nov. 15, 2013  (KR) ........................ 10-2013-0138781

(51) Int. Cl.
*F23D 23/00*   (2006.01)
*F23D 14/08*   (2006.01)
(Continued)

(52) U.S. Cl.
CPC ............. *F23D 23/00* (2013.01); *F23D 14/08* (2013.01); *F23D 14/10* (2013.01); *F23D 14/46* (2013.01);
(Continued)

(58) Field of Classification Search
CPC .......... F23D 23/00; F23D 14/08; F23D 14/10; F23D 14/62; F23D 14/46; F23D 2203/00;
(Continued)

(56) References Cited

U.S. PATENT DOCUMENTS

| 5,318,438 A | * | 6/1994 | Sugahara | ............... F23D 14/045 |
| | | | | 126/92 R |
| 6,746,236 B2 | * | 6/2004 | Kuriyama | ............... F23D 14/04 |
| | | | | 431/278 |

(Continued)

FOREIGN PATENT DOCUMENTS

| CN | 201436472 U | 4/2010 |
| CN | 201935215 U | 8/2011 |

(Continued)

OTHER PUBLICATIONS

International Search Report dated Dec. 2, 2014, issued to International Application No. PCT/KR2014/010887.

*Primary Examiner* — Gregory Huson
*Assistant Examiner* — Daniel E Namay
(74) *Attorney, Agent, or Firm* — Stein IP, LLC

(57) ABSTRACT

A rich-lean combustion apparatus includes a first plate and a second plate provided to face each other to allow a rich mixture to flow therebetween through a rich mixture passage, a third plate provided to allow a lean mixture to flow through a lean mixture passage formed between the second plate and the third plate, a first burner port member for combusting the rich mixture, and a second burner port member for combusting the lean mixture, wherein, between the first plate and the second plate, a mixture inlet into which some of air supplied from a ventilator and a fuel gas injected from a nozzle are introduced, a mixture passage introduction portion and a mixture passage diffuser for allowing the rich mixture flowed into through the mixture inlet to flow to the rich mixture passage, an air inlet into which the remaining (Continued)

of the air supplied from the ventilator is introduced, and an air passage introduction portion through which the air flowed into through the air inlet flows are formed, and wherein a plurality of air through-holes are formed to pass through the second plate to allow the air of the air passage introduction portion to be spouted into an air passage formed between the second plate and the third plate, and a plurality of distribution holes are formed to pass through the second plate to allow some of a mixture passing the mixture passage diffuser to be spouted into the lean mixture passage.

7 Claims, 9 Drawing Sheets

(51) Int. Cl.
 *F23D 14/10* (2006.01)
 *F23D 14/62* (2006.01)
 *F23D 14/46* (2006.01)
 *F23C 5/14* (2006.01)
(52) U.S. Cl.
 CPC ......... *F23D 14/62* (2013.01); *F23D 2203/00* (2013.01); *F23D 2205/00* (2013.01); *F23D 2209/10* (2013.01); *F23D 2209/20* (2013.01); Y02E 20/344 (2013.01)
(58) Field of Classification Search
 CPC ........... F23D 2203/007; F23D 2205/00; F23D 2209/10; F23D 2209/20; F23C 5/14; F23C 2900/06042; F23K 5/007; Y02E 20/344
 USPC .................................. 431/272, 12, 170, 355
 IPC ........... F23D 23/00,14/08, 14/10, 14/62, 14/46; F23C 5/14
 See application file for complete search history.

(56) References Cited

U.S. PATENT DOCUMENTS

| | | | | |
|---|---|---|---|---|
| 9,033,702 | B2 * | 5/2015 | Min | F23D 14/045 126/92 AC |
| 9,091,436 | B2 * | 7/2015 | Homma | F23D 14/46 |
| 9,115,889 | B2 * | 8/2015 | Fukunishi | F23D 14/02 |
| 9,212,817 | B2 * | 12/2015 | Cheng | F23D 14/045 |
| 2009/0291402 | A1 * | 11/2009 | Cho | F23D 14/58 431/278 |
| 2012/0178033 | A1 * | 7/2012 | Kim | F23D 14/045 431/278 |
| 2012/0219920 | A1 * | 8/2012 | Akiyama | F23D 14/586 431/278 |
| 2012/0225393 | A1 * | 9/2012 | Min | F23D 14/10 431/355 |
| 2012/0244482 | A1 * | 9/2012 | Homma | F23D 14/46 431/278 |
| 2012/0308945 | A1 * | 12/2012 | Wada | F23C 6/02 431/278 |
| 2013/0149653 | A1 * | 6/2013 | Fukunishi | F23D 14/02 431/278 |
| 2013/0247844 | A1 * | 9/2013 | Cheng | F23D 14/045 122/18.4 |

FOREIGN PATENT DOCUMENTS

| | | | | |
|---|---|---|---|---|
| JP | 01046517 | A * | 2/1989 | ............... F23N 5/10 |
| JP | 05180435 | A * | 7/1993 | |
| JP | 05180436 | A * | 7/1993 | |
| JP | H 7-42913 | A | 2/1995 | |
| JP | 2002-71109 | A | 3/2002 | |
| JP | 2002-276908 | A | 9/2002 | |
| JP | 2003-254513 | A | 9/2003 | |
| JP | 2010-261615 | A | 11/2010 | |

* cited by examiner

[FIG. 1]
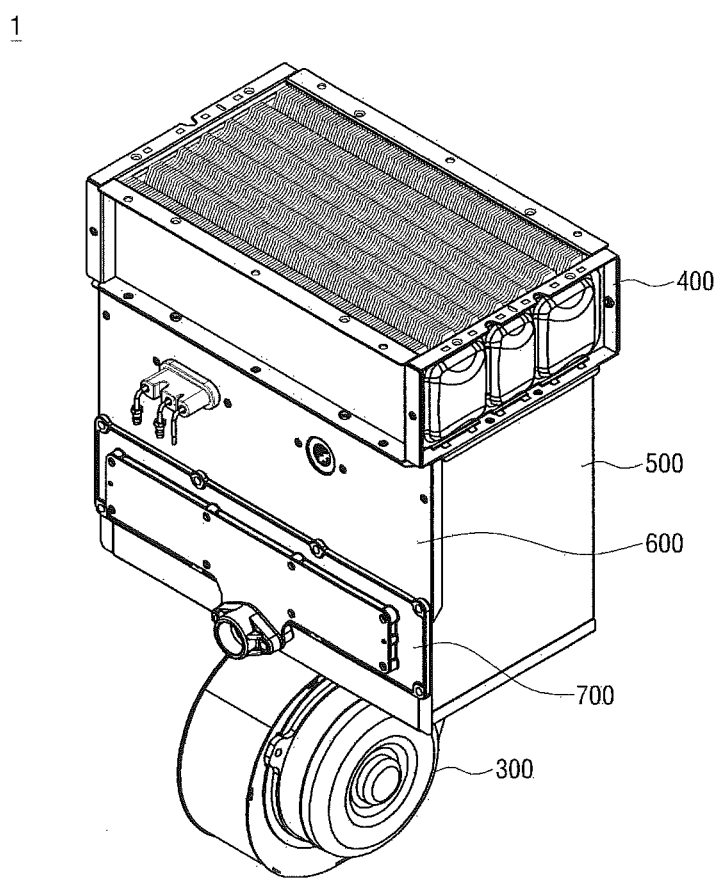

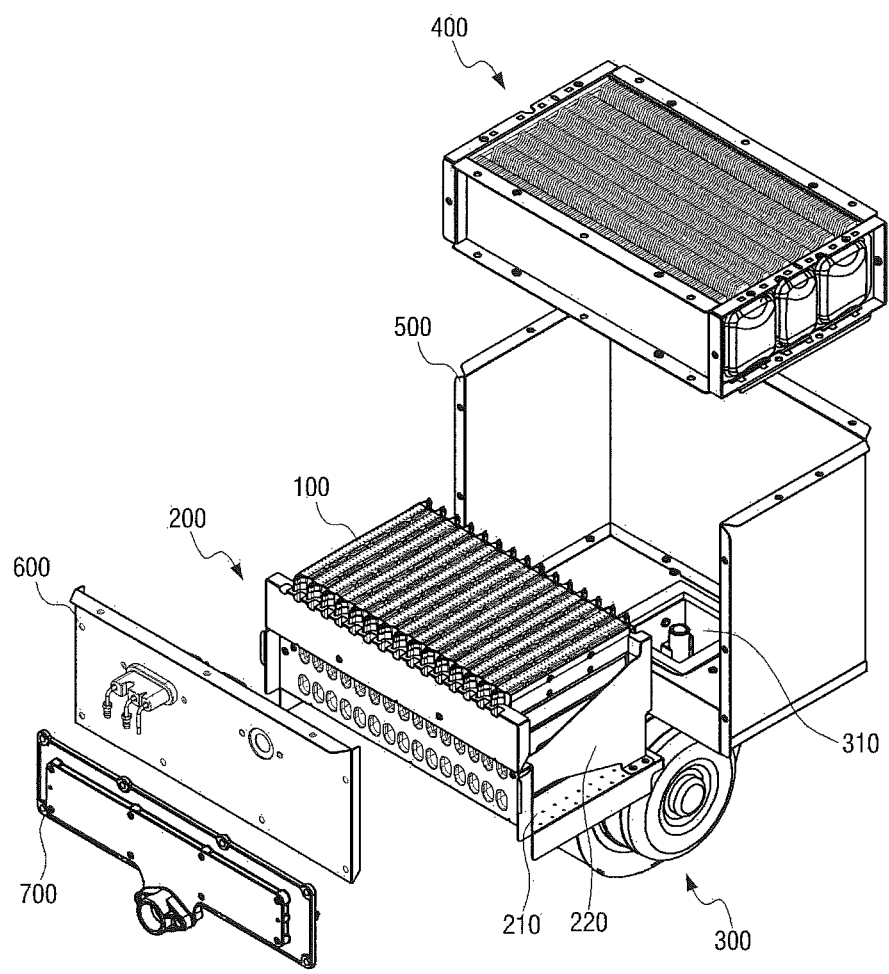
[FIG. 2]

[FIG. 3]
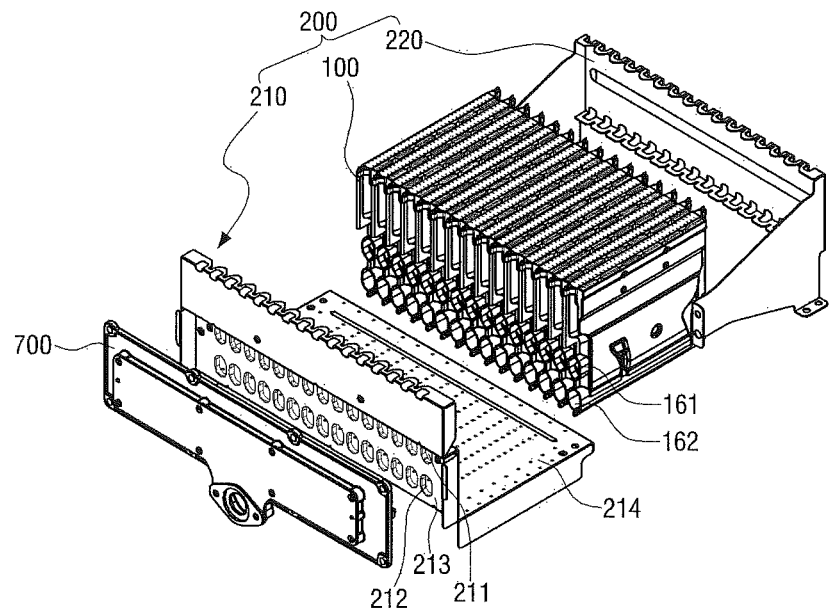
[FIG. 4]
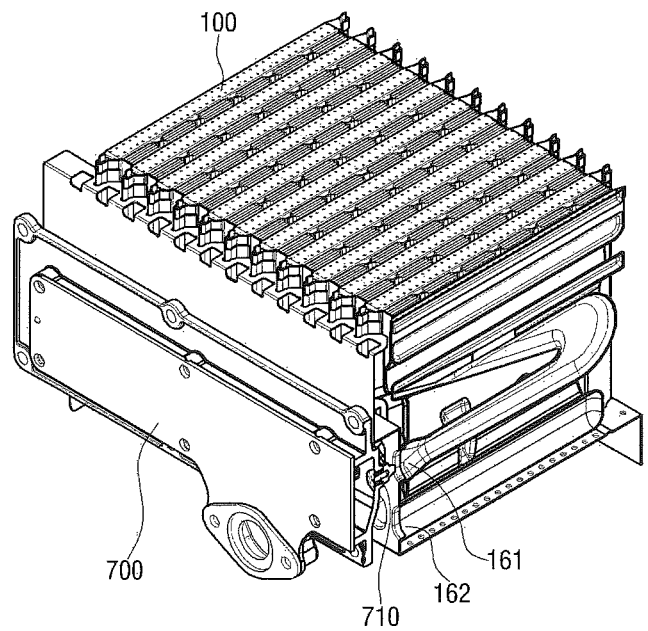

[FIG. 5]
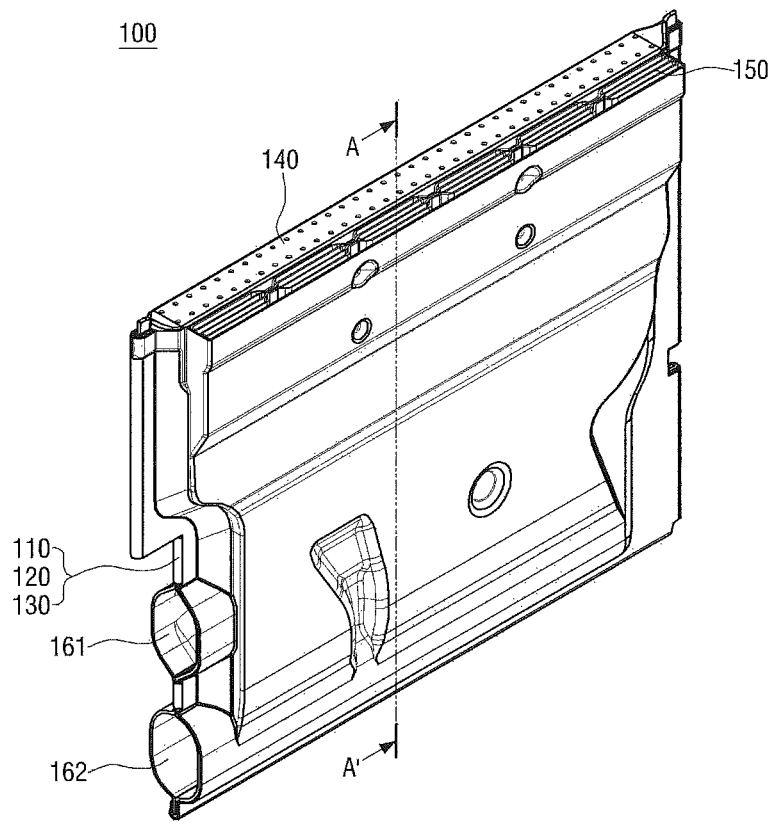

[FIG. 6]
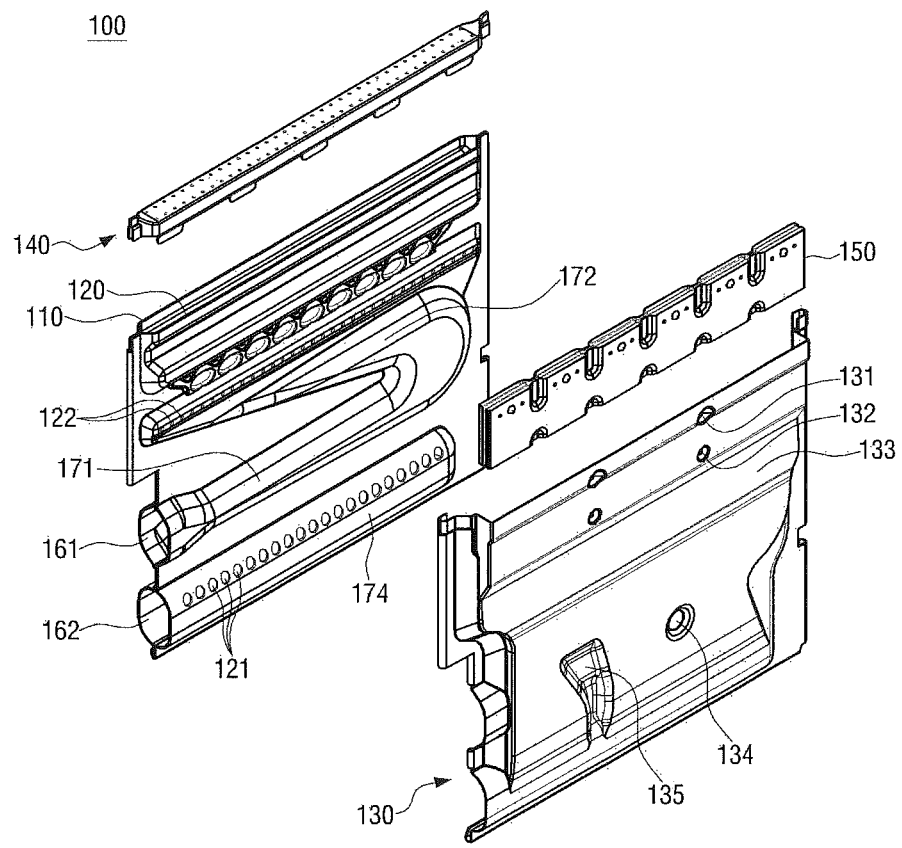

[FIG. 7]
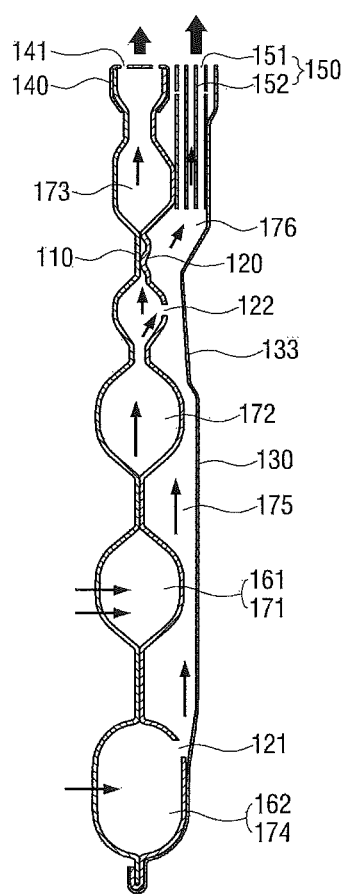

[FIG. 8]
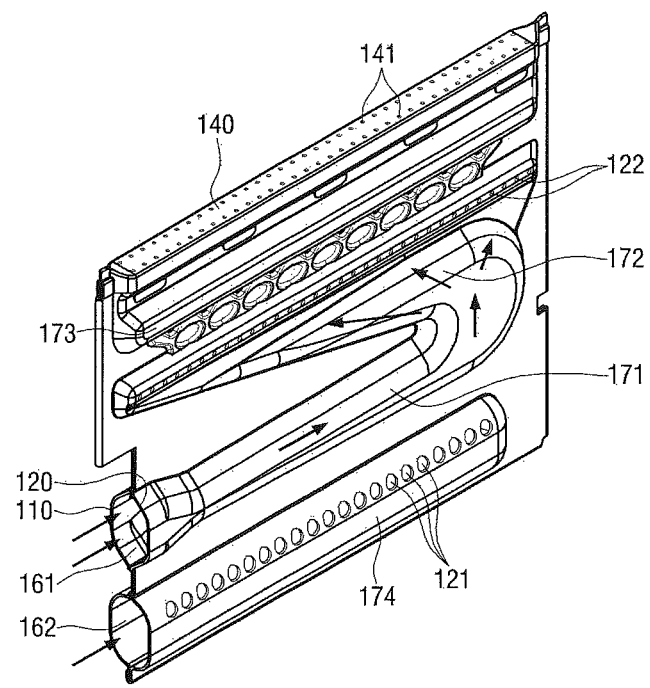

[FIG. 9]
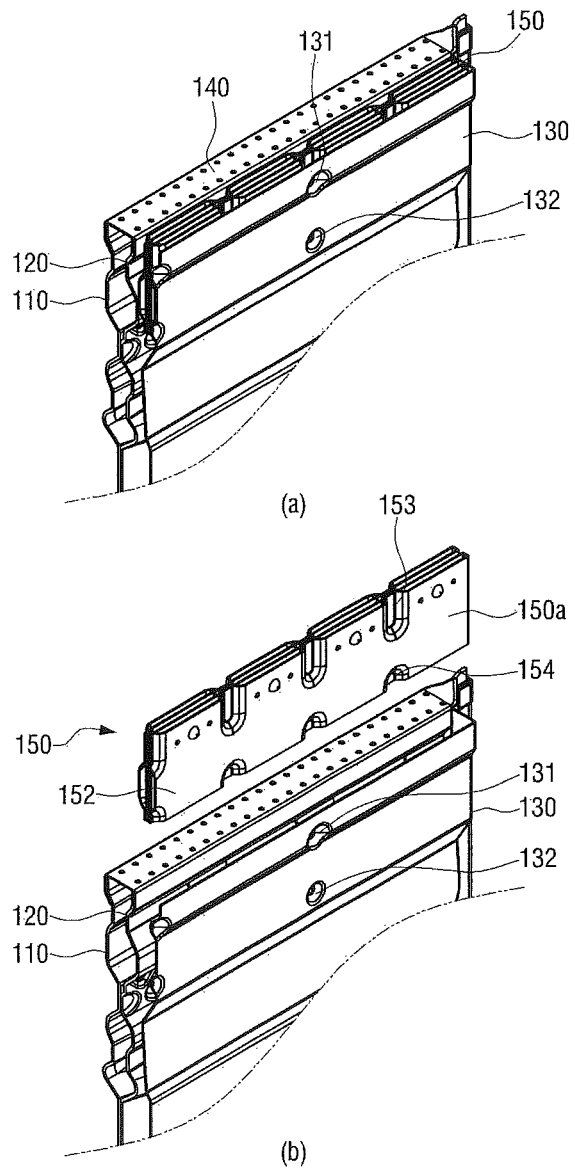

[FIG. 10]
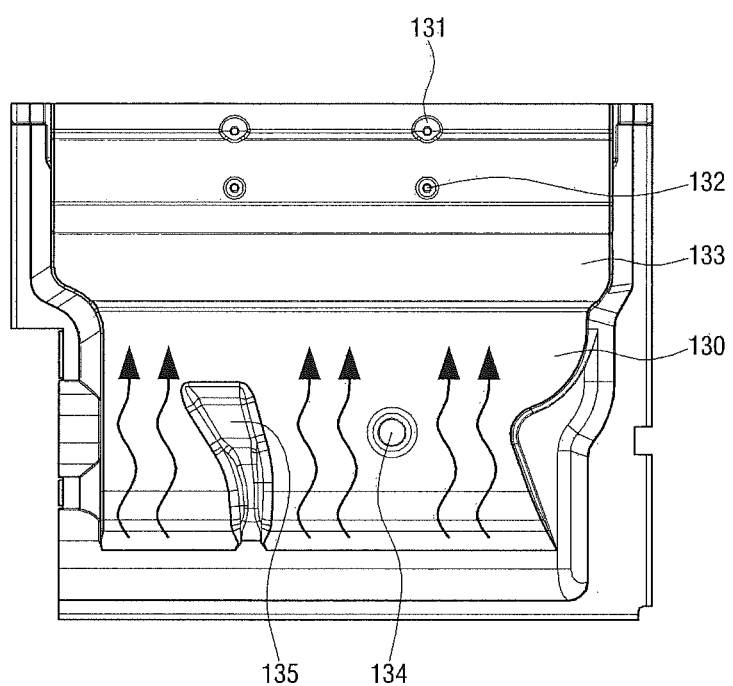

RICH-LEAN COMBUSTION APPARATUS

CROSS-REFERENCE TO RELATED APPLICATIONS

This application is a national stage of International Application No. PCT/KR2014/010887, filed Nov. 13, 2014, which claims the benefit of priority to Korean Application No. 10-2013-0138781, filed Nov. 15, 2013, in the Korean Intellectual Property Office, the disclosures of which is incorporated herein by reference.

TECHNICAL FIELD

The present invention relates to a rich-lean combustion apparatus, and more particularly, to a rich-lean combustion apparatus capable of reducing a generation amount of NOx by simultaneously performing a rich combustion and a lean combustion at a pair of burner ports adjacent to each other, and uniformly supplying fuel and air required for a combustion to the burner ports.

BACKGROUND ART

Generally, a combustion method of gaseous fuel includes a premixed combustion in which gaseous fuel and combustion air are premixed to be supplied to a combustion chamber, a diffusion combustion in which fuel and air are separately supplied, and a partially premixed combustion which is a hybrid between a premixed combustion and a diffusion combustion.

The partially premixed combustion is referred to a combustion performed by a Bunsen burner. The Bunsen burner premixes and supplies a primary air, which is a part of air being supplied, with fuel, and separately supplies secondary air to a flame generation portion, thereby inducing a complete combustion. With advantages of flame stability and low generation possibility of a backfire phenomenon and the like, the Bunsen burner is mainly employed in a combustion apparatus including a typical boiler for home use and the like.

However, since flame of the burner is long and a flame temperature is high due to a structure of the Bunsen burner and also an amount of air required for a combustion is excessively needed more than a theoretical amount of air, heat loss is large due to an exhaust gas of a high temperature and also an exhaust amount of NOx and CO is large so that the Bunsen burner has limitation regarding an efficiency maximization and a pollutant reduction of a combustion apparatus.

As one of combustion methods for reducing a generation amount of NOx, a rich-lean combustion is known in the related art.

Forming simultaneously a fuel rich combustion having a low excess air ratio and a fuel lean combustion having a high excess air ratio in a premixed combustion by avoiding a condition in which a ratio between fuel and excess air at a highest flame temperature is 1, the rich-lean combustion lowers a flame temperature to reduce a generation amount of NOx, and also flame resulting from the fuel rich combustion serves to stabilize an instability phenomenon such as a flame fluttering and the like which may occur while the fuel lean combustion takes place.

An example of a combustion apparatus of such a rich-lean combustion method is disclosed in Korean Registered Patent No. 965277.

However, the combustion apparatus disclosed in Korean Registered Patent No. 965277 is provided with nozzles for supplying a rich mixture and a lean mixture, respectively, so that a structure thereof is complicated due to a plurality of components and there is a problem in which air is not uniformly supplied because some of air supplied from a ventilator is supplied through a hole formed at a partition plate.

DISCLOSURE

Technical Problem

Therefore, to address the problems described above, an object of the present invention is to provide a rich-lean combustion apparatus capable of providing a rich mixture and a lean mixture with only a single nozzle and uniformly supplying air provided from a ventilator.

Another object of the present invention is to provide a rich-lean combustion apparatus capable of reducing a manufacture cost by employing a material of a component exposed to flame different from that of a component not exposed to the flame.

Still another object of the present invention is to provide a rich-lean combustion apparatus capable of constantly maintaining a gap between components through a simplified configuration in coupling a plate to a burner port member which configure a burner body.

Technical Solution

To address the problems described above, a rich-lean combustion apparatus of the present invention includes a first plate 110 and a second plate 120 provided to face each other to allow a rich mixture to flow therebetween through a rich mixture passage 173, a third plate 130 provided to allow a lean mixture to flow through a lean mixture passage 176 formed between the second plate 120 and the third plate 130, a first burner port member 140 for combusting the rich mixture, and a second burner port member 150 for combusting the lean mixture, wherein, between the first plate 110 and the second plate 120, a mixture inlet 161 into which some of air supplied from a ventilator 300 and a fuel gas injected from a nozzle 710 are introduced, a mixture passage introduction portion 171 and a mixture passage diffuser 172 for allowing the rich mixture flowed into through the mixture inlet 161 to flow to the rich mixture passage 173, an air inlet 162 into which the remaining of the air supplied from the ventilator 300 is introduced, and an air passage introduction portion 174 through which the air flowed into through the air inlet 162 flows are formed, and wherein a plurality of air through-holes 121 are formed to pass through the second plate 120 to allow the air of the air passage introduction portion 174 to be spouted into an air passage 175 formed between the second plate 120 and the third plate 130, and a plurality of distribution holes 122 are formed to pass through the second plate 120 to allow some of a mixture passing the mixture passage diffuser 172 to be spouted into the lean mixture passage 176.

One side of the air passage introduction portion 174 may be formed to extend from the air inlet 162 in a horizontal direction and the other side thereof may be formed to occlude a flow of air, and the air through-hole 121 may be formed in plurals along a length direction of the air passage introduction portion 174 and spaced apart from each other.

The first plate 110 and the second plate 120 may be made of a steel material having a surface coated with aluminum, and the third plate 130, the first burner port member 140, and the second burner port member 150 may be made of a stainless material.

A second burner port 151 may be formed at the second burner port member 150 by spacing parts of a plurality of burner plates 152 apart from each other, wherein the second burner port member 150 may include a plurality of upper recessed grooves 153 concavely formed at a surface coming in contact with the third plate 130, and a plurality of lower recessed grooves 154 concavely formed and spaced from the upper recessed grooves 153 in a downward direction, wherein a plurality of upper embossed portions 131 protruding to be insertable into the upper recessed grooves 153 and a plurality of lower embossed portions 132 protruding to be insertable into the lower recessed grooves 154 may be formed at the third plate 130, and wherein the second burner port member 150 may be interposed between the second plate 120 and the third plate 130 to be fixed by an insertion-coupling between the upper recessed grooves 153 and the upper embossed portions 131, and between the lower recessed grooves 154 and the lower embossed portions 132.

The upper recessed groove 153 may have a shape which is opened in an upward direction and is closed in a downward direction, and the lower recessed groove 154 may have a shape which is closed in the upward direction and is opened in the downward direction.

A recessed groove 133 may be concavely formed at a position of the third plate 130 corresponding to the distribution hole 122 in a direction thereof.

At the third plate 130, at least one dispersion embossed portion may be formed at a lower portion of the recessed groove 133 so as to disperse the air spouted through the air through-hole 121 in the horizontal direction.

Advantageous Effects

In accordance with the rich-lean combustion apparatus of the present invention, a rich combustion and a lean combustion may be implemented by a fuel gas supplied from a single nozzle to reduce a number of components.

Also, components of a burner body exposed to flame are made of a stainless material having high corrosion resistance and components thereof not exposed to the flame are made of a steel material coated with aluminum such that manufacture costs of the components may be reduced.

In addition, a plurality of plates and a plurality of burner port members, which configure a burner body, are coupled to each other through a recessed groove and an embossed portion such that a gap between components may be constantly maintained through a simplified structure.

Moreover, a recessed groove and a dispersion embossed portion are formed at a third plate such that a mixture may be uniformly mixed.

DESCRIPTION OF DRAWINGS

FIG. 1 is a perspective view illustrating a coupled state of a combustion apparatus of the present invention.

FIG. 2 is a perspective view illustrating a decoupled state of the combustion apparatus of FIG. 1.

FIG. 3 is a perspective view illustrating a state in which a burner assembly and a gas nozzle assembly are decoupled from the combustion apparatus of FIG. 1.

FIG. 4 is a perspective view illustrating a state in which the burner assembly and the gas nozzle assembly are coupled in the combustion apparatus of FIG. 1.

FIG. 5 is a perspective view illustrating a burner body of the present invention.

FIG. 6 is a perspective view illustrating a decoupled state of the burner body of FIG. 5.

FIG. 7 is a cross-sectional view taken along line A-A' of FIG. 5.

FIG. 8 is a view illustrating a flow process in which a fuel gas and air flowed into the burner body in the combustion apparatus of FIG. 1.

FIG. 9(a) is a perspective view illustrating a state in which first and second burner port members are coupled to first, second, and third plates in the combustion apparatus of FIG. 1.

FIG. 9(b) is a perspective view illustrating a decoupled state of the second burner port member.

FIG. 10 is a view illustrating a flow of air in a space between the second plate and the third plate.

| Description of Reference Numerals | |
|---|---|
| 1: Combustion Apparatus | 100: Burner Body |
| 110: First Plate | 120: Second Plate |
| 121: Air Through-Hole | 122: Distribution Hole |
| 130: Third Plate | 140: First Burner Port Member |
| 150: Second Burner Port Member | 161: Mixture Inlet |
| 162: Air Inlet | 171: Mixture Passage Introduction Portion |
| 172: Mixture Passage Diffuser | 173: Rich Mixture Passage |
| 174: Air Passage Introduction Portion | 175: Air Passage |
| 176: Lean Mixture Passage | 200: Burner Assembly |
| 210: Burner Base | 211: First Inflow Hole |
| 212: Second Inflow Hole | 213: Side Plate |
| 214: Bottom Plate | 220: Burner Cover |
| 300: Ventilator | 400: Heat Exchanger Assembly |
| 500: Combustion Chamber Body | 600: Cover Assembly |
| 700: Gas Nozzle Assembly | 710: Nozzle |

MODES OF THE INVENTION

Hereinafter, a configuration and an operation of a preferred embodiment of the present invention will be described in detail.

FIG. 1 is a perspective view illustrating a coupled state of a combustion apparatus of the present invention, FIG. 2 is a perspective view illustrating a decoupled state of the combustion apparatus of FIG. 1, FIG. 3 is a perspective view illustrating a state in which a burner assembly and a gas nozzle assembly are decoupled from the combustion apparatus of FIG. 1, and FIG. 4 is a perspective view illustrating a state in which the burner assembly and the gas nozzle assembly are coupled in the combustion apparatus of FIG. 1.

A combustion apparatus 1 of the present invention includes a plurality of burner bodies 100, a burner assembly 200 having a burner base 210 and a burner cover 220 which support the burner body 100 in forward and backward directions thereof, a ventilator 300 supplying a combustion air to the burner body 100, a heat exchanger assembly 400 provided at an upper portion of the burner assembly 200 and heat exchanging a combustion gas generated by a combustion in the burner body 100, a combustion chamber body 500 accommodating the burner assembly 200 therein, coupling to the ventilator 300 at a bottom surface of the combustion chamber body 500, and providing a combustion space in which a combustion takes place in an upper space of the burner assembly 200, a cover assembly 600 coupled to one opened side surface of the combustion chamber body 500, and a gas nozzle assembly 700 having a nozzle 710 for supplying a fuel gas to the burner body 100 and coupled to a lower side of the cover assembly 600.

The burner body 100 is provided in plural numbers adjacent to each other, and includes burner port members 140 and 150 shown in FIG. 5 for combusting a mixture flowed into an internal space between the burner bodies 100 to generate flame, which are provided at an upper portion thereof.

The burner base 210 has a cross section in an 'L' shape, and includes a side plate 213 supporting a front edge of the burner body 100 and a bottom plate 214 supporting a lower portion of the burner body 100. The burner cover 220 is coupled to and supported by a rear edge of the burner body 100.

On the side plate 213, a plurality of first inflow holes 211 spaced apart from each other in a horizontal direction are formed at positions corresponding to mixture inlets 161 of the burner bodies 100 to allow a fuel gas injected from the nozzle 710 and some of air supplied from the ventilator 300 to be mixed and then to be flowed into. Also, on the side plate 213, a plurality of second inflow holes 212 spaced apart from each other in the horizontal direction are formed at positions corresponding to air inlets 162 of the burner bodies 100 to allow the remaining of the air supplied from the ventilator 300 to be flowed into.

The gas nozzle assembly 700 is located to cover the first inflow holes 211 and the second inflow holes 212 of the side plate 213, and the nozzles 710 having the same number of the first inflow holes 211 are spaced apart from each other in the horizontal direction and provided at the gas nozzle assembly 700.

The ventilator 300 is coupled to the bottom surface of the combustion chamber body 500, and air supplied from the ventilator 300 flows into a lower space of a bottom surface of the burner base 210 of the burner assembly 200 through a ventilator outlet 310.

FIG. 5 is a perspective view illustrating the burner body of the present invention, FIG. 6 is a perspective view illustrating a decoupled state of the burner body of FIG. 5, FIG. 7 is a cross-sectional view taken along line A-A' of FIG. 5, FIG. 8 is a view illustrating a flowing process in which a fuel gas and air flow into the burner body in the combustion apparatus of FIG. 1, FIG. 9(a) is a perspective view illustrating a state in which first and second burner port members are coupled to first, second, and third plates in the combustion apparatus of FIG. 1, FIG. 9(b) is a perspective view illustrating a decoupled state of the second burner port member, and FIG. 10 is a view illustrating a flow of air in a space between the second plate and the third plate. Hereinafter, with reference to FIGS. 5 to 10, a configuration of the burner body and a flow path of a mixture according to the present invention will be described.

The burner body 100 includes a first plate 110 and a second plate 120 which are provided to face each other to flow a rich mixture through a space therebetween, a third plate 130 provided to flow a lean mixture through a space between the third plate 130 and the second plate 120, a first burner port member 140 for combusting the rich mixture, and a second burner port member 150 for combusting the lean mixture.

The first plate 110 and the second plate 120 are thin plates in which a passage portion through which the mixture and air flow is formed to protrude in an outward direction so as not to come in contact with each other, and a portion at which the mixture and the air do not flow is formed to come in contact with each other, and edges thereof are coupled to each other. The first burner port member 140 is provided at upper portions of the first plate 110 and the second plate 120.

A passage, which is formed between the first plate 110 and the second plate 120 and through which the rich mixture flows, includes the mixture inlet 161 into which a fuel gas injected from the nozzle 710 and some of air supplied from the ventilator 300 is flowed, a mixture passage introduction portion 171 extending in a horizontal direction so as to flow the rich mixture flowed into through the mixture inlet 161, a mixture passage diffuser 172 extending from the mixture passage introduction portion 171 in an upward direction and of which a cross sectional area becomes wider toward the upward direction, and a rich mixture passage 173 extending to an upper side of the mixture passage diffuser 172 to supply the rich mixture to the first burner port member 140.

Some of the rich mixture passing the mixture passage diffuser 172 is spouted into the space between the second plate 120 and the third plate 130 through a plurality of distribution holes 122 formed in a width direction of the second plate 120 and spaced apart from each other at a regular interval.

Also, a passage, which is formed between the first plate 110 and the second plate 120 to form the lean mixture, includes the air inlet 162 formed at a lower side of the mixture inlet 161 and through which the remaining of the air supplied from the ventilator 300 is flowed into, an air passage introduction portion 174 extending in a horizontal direction to allow the air flowed into through the air inlet 162 to flow, a plurality of air through-holes 121 formed at the second plate 120 by passing therethrough along a length direction of the air passage introduction portion 174 so as to allow the air flowed therein to be spouted into the space between the second plate 120 and the third plate 130, an air passage 175 formed to flow the air spouted through the air through-hole 121 in upward direction, and a lean mixture passage 176 extending to an upper side of the air passage 175 to supply the lean mixture to the second burner port member 150.

In the combustion apparatus with such a configuration, by looking at flow paths of the fuel gas and the air, after being flowed into a space at a lower portion of the burner base 210 and toward the mixture inlet 161 and the air inlet 162 in a horizontal direction, the air supplied from the ventilator 300 is dispersed through the mixture inlet 161 and the air inlet 162 to be flowed inside the burner body 100, and fuel and air injected from the nozzle 710 is mixed with air flowed into through the mixture inlet 161 to sequentially pass the mixture passage introduction portion 171, the mixture passage diffuser 172, and the rich mixture passage 173 to be spouted through a first burner port 141 of the first burner port member 140, such that a rich combustion takes place.

Also, the air flowed into the air passage introduction portion 174 through the air inlet 162 is spouted through the air through-hole 121 to flow through the air passage 175, and the air flowing through the air passage 175 is mixed with a mixture spouted through the plurality of distribution holes 122 to generate a lean mixture. The generated lean mixture is spouted through a second burner port 151 of the second burner port member 150 so that a lean combustion takes place.

As described above, the present invention may simultaneously implement the rich combustion and the lean combustion with only the single nozzle 710 without using two nozzles so that a structure of the combustion apparatus may be simplified.

Also, in the related art, some of air supplied from a ventilator is supplied in an upward direction through holes formed at a partition plate (corresponding to the burner base of the present invention). In this case, in order to uniformly supply the air to a plurality of burner bodies, or front and rear sides of a single burner body, it is necessary to differently design a size of each of the holes so that there may occur a problem in which setting a size of every holes formed at the whole area of the partition plate is very difficult.

On the other hand, in the present invention, air supplied from the ventilator outlet 310 is diffused along the space at the lower portion of the burner base 210 and then is flowed into the air passage introduction portion 174 through the air inlet 162, and the air flowed into the air passage introduction portion 174 is spouted into the air passage 175 through the air through-holes 121, so that flow rates of the air in the air inlet 162 and the air through-holes 121 are limited and thus the air is uniformly supplied to each of the plurality of burner bodies 100 and an amount of air spouted through the plurality of air through-holes 121 along the length direction of the air passage introduction portion 174 is uniform, thereby uniformly supplying the air to the front and rear sides of the second burner port member 150. In this case, an adjustment of a supply amount of air may be possible by adjusting a size of only the single air inlet 162 so that design availability may be improved.

Meanwhile, a ratio of the mixture, which is supplied to the first burner port member 140 in which the rich combustion takes place and to the second burner port member 150 in which the lean combustion takes place, is 2:8, and thus the mixture is more supplied to the second burner port member 150, so that flame fonned at a burner port surface of the second burner port member 150 is greater than that formed at the first burner port member 140.

Therefore, the third plate 130, the first burner port member 140, and the second burner port member 150 are made of a stainless material so as to improve corrosion resistance, and the first plate 110 and the second plate 120, which do not directly come in contact with flame because a magnitude of the flame is small, among components configuring the burner body 100 are made of a material in which aluminum is coated on a plate surface of a steel material, so that a manufacture cost may be reduced.

With reference to FIGS. 6 and 7, a recessed groove 133 is concavely formed at a position of the third plate 130 corresponding to the distribution holes 122 in a direction thereof, so that a gap between the second plate 120 and the third plate 130 is narrow at a part at which the distribution holes 122 are formed.

If the gap between the second plate 120 and the third plate 130 is broadened, the mixture supplied to the second burner port member 150 is inclined to the third plate 130. On the other hand, if the recessed groove 133 is formed to narrow the gap between the second plate 120 and the third plate 130, the mixture is uniformly supplied to the second burner port member 150.

Also, with reference to FIG. 9, a plurality of upper recessed grooves 153 concavely formed at a surface 150a coming in contact with the third plate 130 and a plurality of lower recessed grooves 154 concavely formed and spaced apart from the upper recessed grooves 153 in a downward direction are formed at the second burner port member 150, and a plurality of upper embossed portions 131 protruding to be insertable into the upper recessed grooves 153 and a plurality of lower embossed portions 132 protruding to be insertable into the lower recessed grooves 154 are formed at the third plate 130.

The upper recessed groove 153 has a shape in which an upper part is opened and a lower part is closed, and the lower recessed groove 154 has a shape in which an upper part is closed and a lower part is opened.

The second burner port member 150 is interposed between the second plate 120 and the third plate 130 to allow the upper embossed portion 131 to be inserted into the upper recessed groove 153 and the lower embossed portion 132 to be inserted into the lower recessed groove 154, thereby being fixedly coupled between the second plate 120 and the third plate 130. At this point, the upper recessed groove 153 has a shape opened in an upward direction and the lower recessed groove 154 has a shape opened in a downward direction, so that an assembling thereof may be easy.

With such a configuration, the second burner port member 150, the second plate 120, and the third plate 130 may be coupled through a simplified configuration to reduce a manufacture cost and also a gap therebetween may be constantly maintained.

Meanwhile, with reference to FIGS. 6, 7, and 10, a first dispersion embossed portion 134 and a second dispersion embossed portion 135 are concavely foi ied at a lower portion of the recessed groove 133 of the third plate 130 in a direction of the second plate 120.

Therefore, the air spouted through the air through-holes 121 is dispersed in a horizontal direction by the first dispersion embossed portion 134 and the second dispersion embossed portion 135 and then flows in an upward direction through the air passage 175, thereby being uniformly mixed with a mixture flowed into through the distribution holes 122 at a constant ratio.

As described above, the present invention is not limited to the embodiments described in detail, and it should be understood that numerous other modifications can be implemented by those skilled in the art without departing from the technical spirit of the present invention defined by the appended claims, and also such modifications will fall within the scope of the present invention.

The invention claimed is:

1. A rich-lean combustion apparatus comprising:
 a first plate 110 and a second plate 120 provided to face each other to allow a rich mixture to flow therebetween through a rich mixture passage 173;
 a third plate 130 provided to allow a lean mixture to flow through a lean mixture passage 176 formed between the second plate 120 and the third plate 130;
 a first burner port member 140 configured to combust the rich mixture; and
 a second burner port member 150 configured to combust the lean mixture,
 wherein, between the first plate 110 and the second plate 120, a mixture inlet 161 into which some of air supplied from a ventilator 300 and a fuel gas injected from a nozzle 710 are introduced, a mixture passage introduction portion 171 and a mixture passage diffuser 172 for allowing the rich mixture flowed into through the mixture inlet 161 to flow to the rich mixture passage 173, an air inlet 162 into which the remaining of the air supplied from the ventilator 300 is introduced, and an air passage introduction portion 174 through which the air flowed into through the air inlet 162 flows are formed, and
 wherein a plurality of air through-holes 121 are formed to pass through the second plate 120 to allow the air of the air passage introduction portion 174 to be spouted into an air passage 175 formed between the second plate 120 and the third plate 130, and a plurality of distribution holes 122 are formed to pass through the second plate 120 to allow some of a mixture passing the mixture passage diffuser 172 to be spouted into the lean mixture passage 176.

2. The rich-lean combustion apparatus of claim 1, wherein one side of the air passage introduction portion 174 is formed to extend from the air inlet 162 in a horizontal direction and the other side thereof is formed to occlude a flow of air, and the air through-hole 121 is formed in plurals along a length direction of the air passage introduction portion 174 and spaced apart from each other.

3. The rich-lean combustion apparatus of claim 2, wherein a recessed groove 133 is concavely formed at a position of the third plate 130 corresponding to the distribution hole 122 in a direction thereof.

4. The rich-lean combustion apparatus of claim 3, wherein at the third plate 130, at least one dispersion embossed portion is formed at a lower portion of the recessed groove 133 so as to disperse the air spouted through the air through-hole 121 in the horizontal direction.

5. The rich-lean combustion apparatus of claim 1, wherein the first plate 110 and the second plate 120 are made of a steel material having a surface coated with aluminum, and the third plate 130, the first burner port member 140, and the second burner port member 150 are made of a stainless material.

6. The rich-lean combustion apparatus of claim 1, wherein a second burner port 151 is formed at the second burner port member 150 by spacing parts of a plurality of burner plates 152 apart from each other,
wherein the second burner port member 150 includes:
a plurality of upper recessed grooves 153 concavely formed at a surface coming in contact with the third plate 130; and
a plurality of lower recessed grooves 154 concavely formed and spaced from the upper recessed grooves 153 in a downward direction,
wherein a plurality of upper embossed portions 131 protruding to be insertable into the upper recessed grooves 153 and a plurality of lower embossed portions 132 protruding to be insertable into the lower recessed grooves 154 are formed at the third plate 130, and
wherein the second burner port member 150 is interposed between the second plate 120 and the third plate 130 to be fixed by an insertion-coupling between the upper recessed grooves 153 and the upper embossed portions 131, and between the lower recessed grooves 154 and the lower embossed portions 132.

7. The rich-lean combustion apparatus of claim 6, wherein the upper recessed groove 153 has a shape which is opened in an upward direction and is closed in a downward direction, and the lower recessed groove 154 has a shape which is closed in the upward direction and is opened in the downward direction.

* * * * *